(12) United States Patent
Yoo et al.

(10) Patent No.: US 11,944,958 B2
(45) Date of Patent: Apr. 2, 2024

(54) HYDROCRACKING CATALYST FOR HEAVY FRACTION OF BIO-OIL, METHOD FOR PREPARING THE SAME AND METHOD FOR BIO-OIL UPGRADING USING THE SAME

(71) Applicant: KOREA INSTITUTE OF SCIENCE AND TECHNOLOGY, Seoul (KR)

(72) Inventors: Chunjae Yoo, Seoul (KR); Jeong-Myeong Ha, Seoul (KR); Dong Jin Suh, Seoul (KR); Jae Wook Choi, Seoul (KR); Young Hyun Yoon, Seoul (KR); Kyeongsu Kim, Seoul (KR); Chang Soo Kim, Seoul (KR); Kwang Ho Kim, Seoul (KR); Thi Lien Do, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/867,217

(22) Filed: Jul. 18, 2022

(65) Prior Publication Data

US 2023/0201813 A1  Jun. 29, 2023

(30) Foreign Application Priority Data

Dec. 27, 2021  (KR) .................. 10-2021-0188464

(51) Int. Cl.
*B01J 29/24* (2006.01)
*B01J 29/06* (2006.01)
*B01J 29/064* (2006.01)
*B01J 29/072* (2006.01)
*B01J 29/08* (2006.01)
*B01J 29/40* (2006.01)
*B01J 29/46* (2006.01)
*B01J 37/02* (2006.01)

(52) U.S. Cl.
CPC ............ *B01J 29/46* (2013.01); *B01J 29/061* (2013.01); *B01J 29/064* (2013.01); *B01J 29/072* (2013.01); *B01J 29/088* (2013.01); *B01J 29/405* (2013.01); *B01J 37/0201* (2013.01); *B01J 37/0209* (2013.01); *B01J 2229/18* (2013.01); *B01J 2229/186* (2013.01)

(58) Field of Classification Search
CPC ...... B01J 29/061; B01J 29/064; B01J 29/072; B01J 29/088; B01J 29/146; B01J 29/46; B01J 29/405; B01J 29/7057; B01J 29/7615; B01J 29/7415; B01J 2229/18; B01J 2229/186; B01J 37/0209; B01J 37/0201

USPC ........................ 502/73, 74, 77, 79
See application file for complete search history.

(56) References Cited

U.S. PATENT DOCUMENTS

2008/0170986 A1* 7/2008 Kitamura ............. B01J 31/1616
423/700

FOREIGN PATENT DOCUMENTS

| EP | 3 685 917 A1 | 7/2020 |
|---|---|---|
| KR | 96-700801 A | 2/1996 |
| KR | 10-2006-0103899 A | 10/2006 |
| KR | 10-1307226 B1 | 9/2013 |
| KR | 10-2017-0083631 A | 7/2017 |
| KR | 10-2020-0118045 A | 10/2020 |
| KR | 10-2231862 B1 | 3/2021 |
| WO | 94/22564 A1 | 10/1994 |
| WO | 2005/068077 A1 | 7/2005 |
| WO | 2006/063777 A1 | 6/2006 |
| WO | 2016/079507 A1 | 5/2016 |
| WO | 2019/138002 A1 | 7/2019 |
| WO | WO 2020/148269 * | 7/2020 |

OTHER PUBLICATIONS

Zhao et al., "Upgrading Pyrolysis Oil over Ni/HZSM-5 by Cascade Reactions", Angew. Chem 2012, 124, 1-7.*
Zheng et al., "Optimizing Ni—Ce/HZSM-5 catalysts for ex-situ conversion of pine wood pyrolytic vapours into light aromatics and phenolic compounds", International Journal of Hydrogen Energy 45 (2020) 14728-14743.*
Balasundram et al., "In-Situ Catalytic Upgrading of Pyrolysis Vapours from Sugarcan Bagasse over Newly-developed Ni—Ce/HZSM-5 Catalyst: Effect of Catalyst to Biomass Mass Ratio", Chemical Engineering Transactions, (2019), 72, 139-144.*
The Office Action for Korean Patent Application No. 10-2021-0188464, dated Oct. 17, 2023.
Gregory T. Neumann et al., "Effects of Cerium and Aluminum in Cerium-Containing Hierarchical HZSM-5 Catalysts for Biomass Upgrading", Top Catal, 2012, vol. 55, pp. 196-208.

* cited by examiner

*Primary Examiner* — Elizabeth D Wood

(57) ABSTRACT

Disclosed herein are a catalyst for hydrocracking reaction of high molecular weight components in bio-oil, a method for preparing the same and a method for bio-oil upgrading using the same. The catalyst includes a zeolite carrier; and at least one metal selected from the group consisting of nickel (Ni), ruthenium (Ru) and cerium (Ce) supported on the carrier. The catalyst promotes the hydrocracking of high molecular weight compounds contained in the bio-oil, but also inhibits the polymerization reaction of the decomposed product, thereby more effectively enhancing the hydrocracking reaction of the bio-oil.

4 Claims, 2 Drawing Sheets

HYDROCRACKING CATALYST FOR HEAVY FRACTION OF BIO-OIL, METHOD FOR PREPARING THE SAME AND METHOD FOR BIO-OIL UPGRADING USING THE SAME

CROSS REFERENCE TO RELATED APPLICATION

The present application claims priority to Korean Patent Application No. 10-2021-0188464, filed Dec. 27, 2021, the entire contents of which is incorporated herein for all purposes by this reference.

BACKGROUND OF THE INVENTION

Field of the Invention

Description of Government-Sponsored Research

This study was made at the Korea Institute of Science and Technology under the management of the National Research Foundation of Korea under the Ministry of Science and ICT, with the research project name of R&D to cope with Climate Change, and the research task name of development of deoxygenation upgrading catalytic chemical process technology for bio-jet fuel production from wood pyrolysis oil (task identification number: 1711130383).

Disclosed in the present disclosure are a catalyst for hydrocracking reaction of high molecular weight components in bio-oil, a method for preparing the same and a method for bio-oil upgrading using the same.

Description of the Related Art

Since petrochemical-based fuels or petrochemical products can be produced from biomass through bio-oil upgrading technology using catalysts, bio-oil conversion technology is attracting attention as an eco-friendly technology that can replace the existing fossil fuel demand.

Fluid bio-oil is mainly obtained by thermal decomposition of solid biomass. By breaking a large amount of C—O bonds and C—C bonds in biomass with heat, organic compounds with low molecular weight such as organic acids, phenols, guaiacol, and syringol-based monomers are present as major components in bio-oil. However, on the contrary, new C—C bonds are formed due to unstable and highly reactive functional groups generated during thermal decomposition, which leads to the synthesis of high molecular weight polymers. For this reason, bio-oil consists of a mixture with various molecular weights.

Rather than directly upgrading such a mixture, the process of selectively decomposing high molecular weight compounds and then converting to fuel or petrochemical products through an upgrading process using lower molecular weight organic compounds is expected to be more efficient in terms of yield. To this end, it is necessary to develop an effective hydrocracking catalyst that can suppress the polymerization reaction of decomposed products while having high decomposition reactivity for high molecular weight compounds in bio-oil.

SUMMARY OF THE INVENTION

In one aspect, an object of the present disclosure is to provide a hydrocracking catalyst of bio-oil.

In another aspect, an object of the present disclosure is to provide a method for preparing a hydrocracking catalyst of bio-oil.

In still another aspect, an object of the present disclosure is to provide a method for hydrocracking bio-oil using the hydrocracking catalyst of bio-oil.

In one aspect, the present disclosure provides a hydrocracking catalyst of bio-oil including a zeolite carrier; and at least one metal selected from the group consisting of nickel (Ni), ruthenium (Ru) and cerium (Ce) supported on the carrier.

In an exemplary embodiment, the zeolite carrier may be at least one selected from the group consisting of HY, HZSM-5 and Hβ.

In an exemplary embodiment, the zeolite carrier may be HZSM-5.

In an exemplary embodiment, the metal may include nickel (Ni), ruthenium (Ru) and cerium (Ce).

In an exemplary embodiment, the metal may be supported in an amount of 1 to 30% by weight based on a total weight of the catalyst.

In an exemplary embodiment, the catalyst may be one in which nickel oxide and/or ruthenium oxide is supported on the zeolite carrier on which cerium oxide is supported.

In an exemplary embodiment, the bio-oil may be a non-aqueous fraction of bio-oil.

In another aspect, the present disclosure relates to a method for preparing a hydrocracking catalyst of bio-oil, the catalyst includes a zeolite carrier; and at least one metal selected from the group consisting of nickel (Ni), ruthenium (Ru) and cerium (Ce) supported on the carrier, and the preparation method provides a method for preparing a hydrocracking catalyst of bio-oil, including the steps of mixing a metal precursor solution and a zeolite carrier; and drying and heat-treating the mixture.

In another aspect, the present disclosure relates to a method for hydrocracking bio-oil, the catalyst includes a zeolite carrier; and at least one metal selected from the group consisting of nickel (Ni), ruthenium (Ru) and cerium (Ce) supported on the carrier, and the method provides a method for hydrocracking bio-oil, including the steps of adding the hydrocracking catalyst of bio-oil to bio-oil and performing a hydrocracking reaction.

In an exemplary embodiment, the method may include the steps of introducing bio-oil, methanol and hydrogen gas into a reactor; and adding the hydrocracking catalyst of bio-oil in the reactor and performing a hydrocracking reaction.

In an exemplary embodiment, the bio-oil and methanol may be mixed in a weight ratio of 1:9 to 10:0 by weight.

In an exemplary embodiment, the hydrocracking reaction may be performed under a hydrogen pressure of 2 to 50 atm.

In an exemplary embodiment, the hydrocracking reaction may be performed at 200 to 300° C.

In one aspect, the technology disclosed in the present disclosure is effective in providing a hydrocracking catalyst of bio-oil.

In another aspect, the technology disclosed in the present disclosure is effective in providing a method for preparing a hydrocracking catalyst of the bio-oil.

In still another aspect, the technology disclosed in the present disclosure is effective in providing a method for hydrocracking bio-oil using the hydrocracking catalyst of bio-oil.

DETAILED DESCRIPTION OF THE INVENTION

Figure 1:
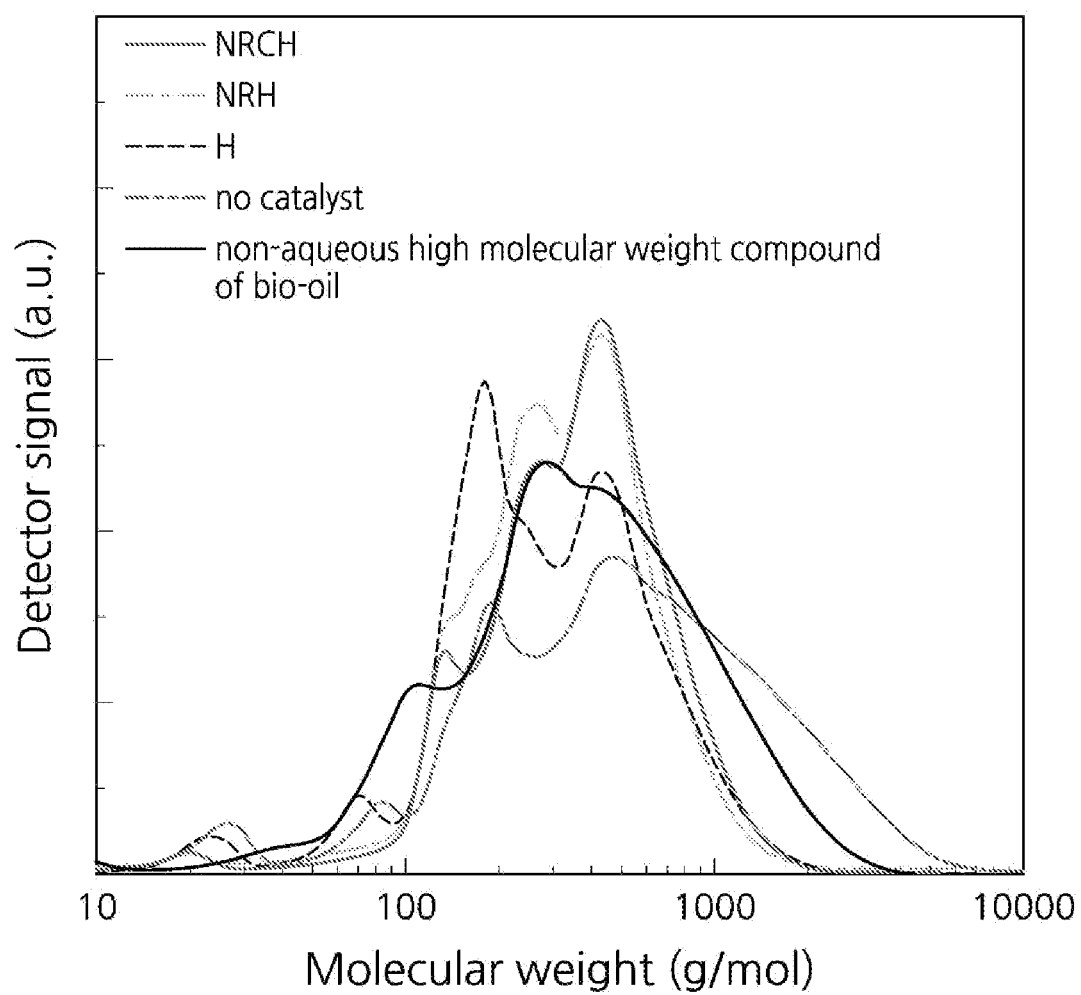
FIG. 1 shows the analysis result of the hydrocracking product of bio-oil according to the type of catalyst according to an experimental example. The graph shows the molecular weight distribution of the product dissolved in methanol.

Hereinafter, the present disclosure will be described in detail.

In one aspect, the present disclosure provides a hydrocracking catalyst of bio-oil including a zeolite carrier; and at least one metal selected from the group consisting of nickel (Ni), ruthenium (Ru) and cerium (Ce) supported on the carrier.

Zeolite is a high surface area, crystalline, porous material with a three-dimensional structure based on silicon and aluminum atom.

In an exemplary embodiment, the zeolite carrier is the zeolite ion-exchanged with hydrogen, and may be, for example, at least one selected from the group consisting of HY, HZSM-5, and Hβ.

In an exemplary embodiment, the zeolite carrier may be HZSM-5.

In an exemplary embodiment, the metal may be supported in an oxide form.

In an exemplary embodiment, the metal may include nickel (Ni), ruthenium (Ru), and cerium (Ce).

In an exemplary embodiment, the metal may be supported in an amount of 1 to 30% by weight based on the total weight of the catalyst. In another exemplary embodiment, the metal is 1% by weight or more, 5% by weight or more, 10% by weight or more, 15% by weight or more, 20% by weight or more or 25% by weight or more, and 30% by weight or less, 25% by weight or less, 20% by weight or less, 15% by weight or less, 10% by weight or less or 5% by weight or less, based on the total weight of the catalyst.

In an exemplary embodiment, the metal may include nickel (Ni) in an amount of 1 to 10% by weight based on the total weight of the catalyst. In another exemplary embodiment, the metal may include nickel in an amount of 1% by weight or more, 3% by weight or more, 5% by weight or more or 7% by weight or more, and 10% by weight or less, 8% by weight or less, 6% by weight or less, 4% by weight or less or 2% by weight or less, based on the total weight of the catalyst.

In an exemplary embodiment, the metal may include ruthenium (Ru) in an amount of 1% by weight or less based on the total weight of the catalyst. In another exemplary embodiment, the metal may include ruthenium in an amount of 0.01% by weight or more, 0.05% by weight or more, 0.1% by weight or more or 0.5% by weight or more, and 1% by weight or less, 0.8% by weight or less, 0.6% by weight or less, 0.4% by weight or less or 0.2% by weight or less, based on the total weight of the catalyst.

In an exemplary embodiment, the metal may include cerium (Ce) in an amount of 4 to 12% by weight based on the total weight of the catalyst. In another exemplary embodiment, the metal may include cerium in an amount of 4% by weight or more, 6% by weight or more, 8% by weight or more or 10% by weight or more, and 12% by weight or less, 10% by weight or less, 8% by weight or less or 6% by weight or less, based on the total weight of the catalyst.

In an exemplary embodiment, the catalyst may be one in which nickel oxide and/or ruthenium oxide are supported on the zeolite carrier on which cerium oxide is supported.

In an exemplary embodiment, the catalyst may be one in which nickel oxide and ruthenium oxide are supported on the zeolite carrier on which cerium oxide is supported. The catalyst has the effect of more effectively promoting the hydrocracking of high molecular weight compounds of bio-oil by a ceria-modified zeolite carrier on which nickel oxide and ruthenium oxide are supported.

The hydrocracking reaction is a reaction that decomposes a high molecular weight compound into a low molecular weight compound by adding hydrogen. For example, the hydrocracking reaction may refer to a reaction in which a liquid product with reduced viscosity is produced by using bio-oil, which is a thermal decomposition product of biomass, as a reactant. In another exemplary embodiment, the hydrocracking reaction may be to hydrogenate or/and saturate unsaturated structures of aromatic, olefin, and the like.

In an exemplary embodiment, the hydrocracking reaction may be to crack bio-oil under high temperature and high pressure conditions under a hydrogen atmosphere.

In an exemplary embodiment, the bio-oil may be obtained by thermally decomposing a biomass raw material by a method such as pyrolysis, hydrothermal liquefaction, or solvothermal liquefaction. Through such thermal decomposition, sugars and sugar-derived low molecular weight compounds, aromatic compounds, phenol-based compounds, fats and oils, and oils and fats-derived compounds, and oligomers or high molecular weight compounds obtained by polymerization of these low molecular weight compounds can be obtained. Alternatively, the bio-oil may be obtained by chemically or biologically decomposing a biomass raw material.

In an exemplary embodiment, the biomass may be at least one selected from the group consisting of lignocellulose, cellulose, hemicellulose, lignin, lipid, macroalgae, microalgae and carbohydrate.

In an exemplary embodiment, the catalyst may promote the hydrocracking of a high molecular weight compound contained in bio-oil. In the conventional case of upgrading biomass pyrolysis oil through direct hydrodeoxygenation reaction, there are disadvantages in that coke formation and low yield are exhibited due to high molecular weight compounds of pyrolysis oil. The catalyst according to the present disclosure does not directly hydrocrack bio-oil, but hydrocracks high molecular weight compounds fractionated from bio-oil to further increase the upgrading efficiency of bio-oil. Through this, it is possible to increase the yield of the hydrodeoxygenation reaction of the rear stage by removing high molecular weight compounds that may be a problem in the process in upgrading the bio-oil at the rear stage.

In an exemplary embodiment, the bio-oil may be obtained by separating a high molecular weight compound having water insolubility from the bio-oil. The present disclosure provides a hydrocracking catalyst that selectively reduces molecular weight of a high molecular weight compound.

In an exemplary embodiment, the bio-oil may be a non-aqueous fraction of bio-oil. For example, the fraction may be a mixture of non-aqueous high molecular compounds contained in bio-oil.

Through the hydrocracking of the non-aqueous high molecular weight compounds of bio-oil by using the catalyst according to the present disclosure, it is possible to obtain a compound with a low molecular weight, as well as inhibit the polymerization reaction of the decomposed product, thereby more effectively increasing the hydrocracking efficiency.

In another aspect, the present disclosure provides a method for preparing a hydrocracking catalyst of bio-oil, including the steps of mixing a metal precursor solution and a zeolite carrier; and drying and heat-treating the mixture.

In an exemplary embodiment, the drying may be performed at 50 to 110° C.

In an exemplary embodiment, the heat treatment may be performed under a hydrogen atmosphere.

In an exemplary embodiment, the heat treatment may be performed at 400 to 600° C.

In another aspect, the present disclosure provides a method for hydrocracking bio-oil, including the steps of adding the hydrocracking catalyst of bio-oil to bio-oil and performing a hydrocracking reaction.

In an exemplary embodiment, the bio-oil may be a non-aqueous fraction of bio-oil.

In an exemplary embodiment, the method may include the steps of introducing bio-oil, methanol and hydrogen gas into a reactor; and adding the hydrocracking catalyst of bio-oil in the reactor and performing a hydrocracking reaction.

In an exemplary embodiment, the bio-oil and methanol may be mixed in a weight ratio of 1:9 to 10:0 by weight or 1:9 to 9:1 by weight.

In an exemplary embodiment, the hydrocracking reaction may be performed under a hydrogen pressure of 2 to 50 atm.

In an exemplary embodiment, the hydrocracking reaction may be performed at 200 to 300° C.

In an exemplary embodiment, the hydrocracking reaction may be performed for 0.5 to 24 hours.

The method may be a bio-oil upgrading method for upgrading bio-oil by hydrocracking the high molecular weight compounds of bio-oil.

The hydrocracking reaction method of bio-oil according to the present disclosure has high decomposition reactivity with respect to high molecular weight compounds of bio-oil and suppresses the polymerization of decomposed products, thereby further improving hydrocracking efficiency.

Hereinafter, the present disclosure will be described in more detail through examples. These examples are only for illustrating the present disclosure, and it will be apparent to those of ordinary skill in the art that the scope of the present disclosure is not to be construed as being limited by these examples.

Example 1. Carrier Preparation (1) HZSM-5

ZSM-5 in the form of ammonium ion was obtained from Alfa Aesar, and it was calcined at 500° C. to convert it to HZSM-5 in the form of hydrogen ion and used in the following experiment. This was referred to as 'H'.

(2) Ce Supported HZSM-5

5.26 g of the prepared carrier HZSM-5 and 1.52 g of cerium nitrate hexahydrate ($Ce(NO_3)_3 \cdot 6H_2O$) were dissolved in 150 mL of ion-exchanged water, stirred at room temperature for 4 hours, and dried at 70° C. using a rotary evaporator. The dried powder was dried at 150° C. for 12 hours to prepare a ceria-supported HZSM-5 carrier. This was referred to as 'CH'.

Example 2. Catalyst Preparation

Using the carrier prepared in Example 1, a catalyst on which nickel oxide and/or ruthenium oxide was supported was prepared as follows.

Nickel nitrate hexahydrate ($Ni(NO_3)_2 \cdot 6H_2O$) and/or ruthenium chloride hydrate ($RuCl_3 \cdot xH_2O$) was dissolved in 100 mL of ion-exchanged water, and then mixed with one carrier of HZSM-5 (H) and ceria supported HZSM-5 (CH) (see Table 1 below). Then, the mixture was stirred at room temperature for 4 hours and dried at 70° C. using a rotary evaporator. The dried powder was dried at 105° C. for 12 hours and then heat treated at 500° C. and hydrogen atmosphere for 6 hours. The prepared catalysts were referred to as 'NH', 'RH', 'NRH', 'NCH', 'RCH', and 'NRCH', respectively.

TABLE 1

| Catalyst Name | Carrier (g) | Nickel Nitrate Hexahydrate $Ni(NO_3)_2 \cdot 6H_2O$ (g) | Ruthenium Chloride Hydrate $RuCl_3 \cdot xH_2O$ (g) |
|---|---|---|---|
| RH | 5.9760 | 0 | 0.0578 |
| NH | 5.5260 | 2.4212 | 0 |
| NRH | 5.5020 | 2.4212 | 0.0578 |
| RCH | 5.5200 | 0 | 0.0578 |
| NCH | 5.0460 | 2.4212 | 0 |
| NRCH | 5.0220 | 2.4212 | 0.0578 |

Experimental Example 1. Hydrocracking of Bio-Oil

The non-aqueous high molecular weight compound was isolated from bio-oil obtained through pyrolysis of biomass, and this was used as a starting material. Hydrocracking was carried out by adding the catalysts prepared in Examples 1 and 2, and catalytic activity was comparatively evaluated. 30 g of a methanol mixture containing 10 mass % of the non-aqueous bio-oil and 0.3 g of catalyst were introduced into the reactor, 5 MPa hydrogen gas was filled at room temperature, and then the reactor was heated to a temperature of 250° C. and performed batch reaction while maintaining at the reached temperature. The products after the reaction were analyzed by gas chromatography (GC) and gel permeation chromatography (GPC) to analyze the amount of components soluble in methanol and their molecular weights. The analysis results are shown in Table 2 and FIG. 1, respectively.

TABLE 2

| Catalyst | $g_{product}/g_{initial\ bio-oil}$ * 100% Methanol soluble |
|---|---|
| H | 14.4 |
| CH | 19.8 |
| RH | 17.0 |
| NH | 28.9 |
| NRH | 19.0 |
| RCH | 25.4 |
| NCH | 30.3 |
| NRCH | 56.1 |

As a result, it was confirmed that the carriers and catalysts prepared in Examples 1 and 2 were able to lower the molecular weight of the high molecular weight compound contained in the bio-oil by partially performing the hydrocracking reaction. In FIG. 1, the HZSM-5 carrier (H) appears to produce a large amount of low molecular weight components among the components soluble in methanol, but GPC result is an index indicating the concentration rather than the absolute amount of the component. As shown in Table 2, comparing the absolute amounts, it was confirmed that the HZSM-5 carrier (H) produced less amount of low molecular weight components than ceria supported HZSM-5 carrier (CH) or other catalysts. In addition, it was confirmed that the amount of the low molecular weight product varies depending on the type of carrier and the type of metal supported on the carrier. Specifically, it was confirmed that the catalyst (NRCH) in which nickel and ruthenium were supported together on the HZSM-5 carrier on which ceria was supported significantly increased the amount of low molecular weight products compared to other catalysts, thereby providing a high yield. Accordingly, it was confirmed that, when the catalyst is used, the hydrocracking reaction was performed with high efficiency by suppressing the polymerization reaction of the decomposed products while having high decomposition reactivity with respect to the high molecular weight compounds of the bio-oil.

In addition, the hydrocracking reaction was performed in the same manner as above using the entire bio-oil components, rather not the non-aqueous fraction of the bio-oil, as a reactant, and the NRCH prepared in Example 2 as a catalyst. After performing the hydrocracking reaction, the reaction products were compared.

Figure 2:
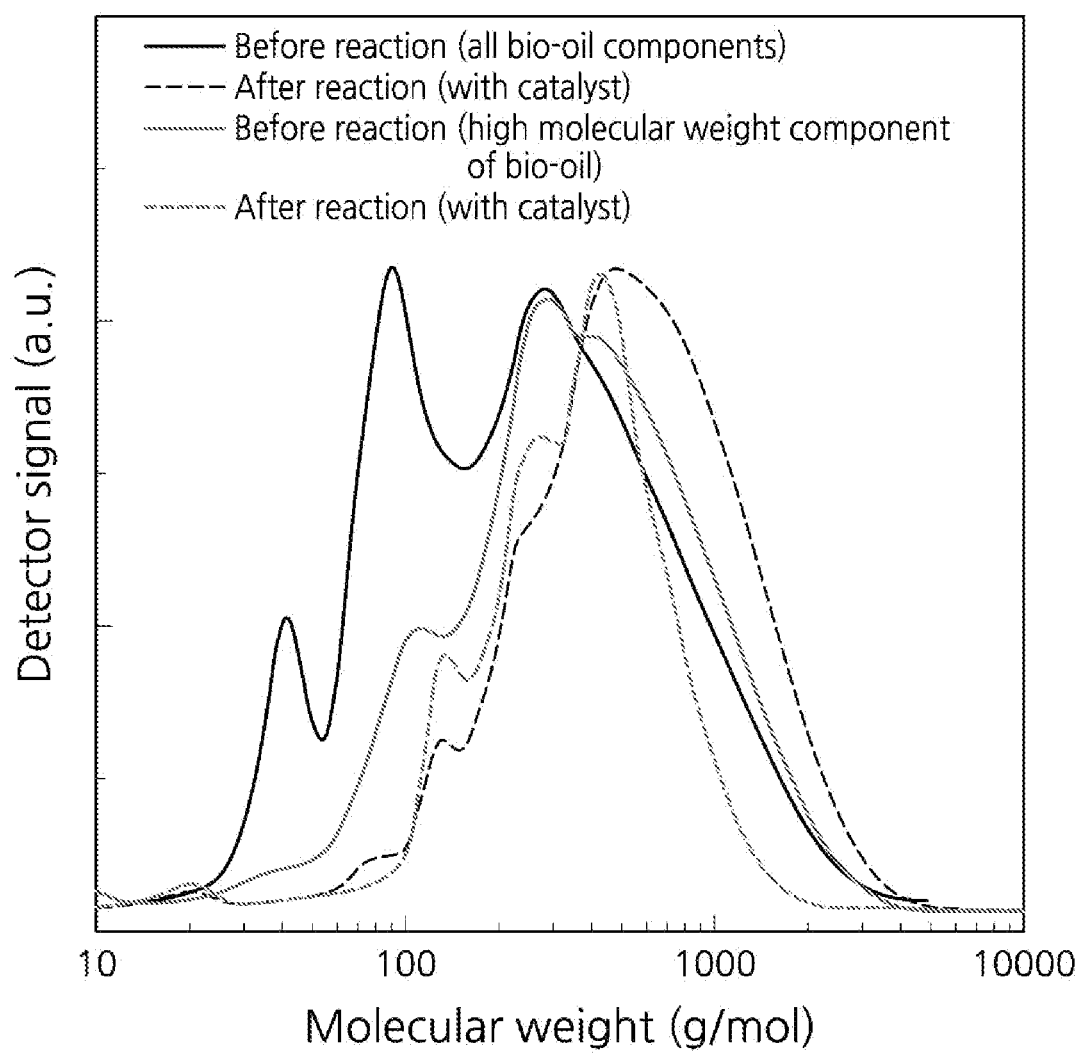
FIG. 2 shows a comparison result of reaction products between the hydrocracking reaction performed using all bio-oil components as a reactant and the hydrocracking reaction performed using high molecular weight components of bio-oil, that is, a non-aqueous fraction of bio-oil as a reactant according to an experimental example.

As a result, as shown in the gel permeation chromatography (GPC) analysis result of FIG. 2, it was found that the molecular weight of the reaction product was rather increased when all components of the bio-oil were subjected to a direct hydrocracking reaction (see black solid line and dotted line). On the other hand, when the non-aqueous fraction obtained by separating the non-aqueous high molecular weight compounds from bio-oil was subjected to the hydrocracking reaction, the molecular weight of the high molecular weight compound was decreased (see gray solid line and dotted line). Accordingly, it was confirmed that the hydrocracking efficiency was further improved when the catalyst was added to the non-aqueous fraction of bio-oil.

As described above, specific parts of the present disclosure have been described in detail, and it will be apparent to those of ordinary skill in the art that these specific techniques are only preferred embodiments, and the scope of the present disclosure is not limited thereby. Accordingly, it is intended that the substantial scope of the present disclosure be defined by the appended claims and their equivalents.

What is claimed is:

1. A hydrocracking catalyst for a bio-oil comprising:
a zeolite carrier; and
metals consisting of nickel (Ni), ruthenium (Ru) and cerium (Ce) are supported on the carrier,
wherein the catalyst comprises nickel oxide and ruthenium oxide subsequently supported on the zeolite carrier on which cerium oxide is first supported, and
wherein the hydrocracking catalyst is for a non-aqueous fraction of a bio-oil.

2. The hydrocracking catalyst according to claim 1, wherein the zeolite carrier is at least one selected from the group consisting of HY, HZSM-5 and Hβ.

3. The hydrocracking catalyst according to claim 2, wherein the zeolite carrier is HZSM-5.

4. The hydrocracking catalyst according to claim 1, wherein the the combined amount of metals are supported in an amount of 1 to 30% by weight based on a total weight of the catalyst.

* * * * *